UNITED STATES PATENT OFFICE 2,462,185

MOISTUREPROOF, HEAT-SEALABLE WRAPPING MATERIAL AND PROCESS

Paul Matthew Hauser, Kenmore, N. Y., assignor to E. I. du Pont de Nemours & Company, Wilmington, Del., a corporation of Delaware No Drawing. Application February 19, 1946, Serial No. 648,831

8 Claims. (Cl. 117—76)

This invention relates to moistureproof sheet wrapping material and more particularly to transparent regenerated cellulose film provided with a well adhered moistureproofing coating of vinylidene chloride-acrylonitrile copolymer.

An outstanding problem in the utilization of vinylidene chloride-acrylonitrile copolymers as coatings for regenerated cellulose film to be used as transparent wrapping tissue has been to adhere the coating to the base sheet. Vinylidene chloride-acrylonitrile coatings adhere very poorly to regenerated cellulose film and the usual expedients for anchoring conventional moistureproofing coating to base film do not in general yield satisfactory results when applied to the copolymers. Obviously, unless a high order of adhesion is obtained, full advantage cannot be taken of the desirable properties of moistureproofness and heat-sealability inherent in such copolymers.

Therefore, a principal object of this invention is to tightly adhere vinylidene chloride-acrylonitrile copolymer coatings to regenerated cellulose film. Another object is to provide a transparent wrapping tissue of regenerated cellulose film moistureproofed and rendered heat-sealable with a coating of vinylidene chloride-acrylonitrile copolymer firmly anchored to the base film. Still another object is to provide an intermediate coating effective for bonding moistureproof, heat-sealable vinylidene chloride-acrylonitrile copolymer to regenerated cellulose. These and other objectives will more clearly appear in the following exposition.

I have found that a composition comprising essentially nitrocellulose and an alcohol modified methylol melamine water-insoluble, thermosetting resin wherein the ratio of resin to nitrocellulose is within the critical range hereinafter specified constitutes an excellent anchorage coating for adhering or bonding moistureproof, heat-sealable vinylidene chloride-acrylonitrile top-coatings to a base of regenerated cellulose film.

Accordingly, the above objects are realized by first coating the regenerated cellulose base film with the nitrocellulose, and alcohol modified methylol melamine resin dissolved in a suitable volatile organic solvent or solvent mixture, heating to an extent sufficient to evaporate the solvent and, if desired, to complete the polymerization and hardening of the resin, and thereafter top-coating the resulting coated base film with vinylidene chloride-acrylonitrile dissolved in a suitable volatile organic solvent or solvent mixture. If desired, optimum polymerization and hardening of the thermosetting resin may be effected simultaneously with removal of solvent from the top-coat.

The resinous materials particularly suitable for purposes of this invention are the ether type derivatives formed from a methylol melamine, preferably trimethylol melamine, in the presence of monohydric alcohols such as propyl, butyl, isobutyl, hexyl, octyl, lauryl, benzyl, and the like. These are insoluble in water and are soluble in the common non-aqueous organic solvents, and can, if desired, be polymerized further during the drying of either the undercoated or topcoated film. Although the monomeric crystalline monohydric aliphatic alcohol ethers of methylol melamines can be employed in the anchor coating in order to save time, and to avoid the necessity of subjecting the base film to prolonged heating incident to polymerization, it is generally desirable to use a partially polymerized, resinous material initially. As the number of carbon atoms in the modifying alcohol increases the softness of the resultant resin also increases and a longer baking schedule is required to bring the resin to an optimum degree of polymerization and hardness. Therefore, it is desirable to use resins derived from the lower aliphatic monohydric alcohols, and those resins derived from the lower aliphatic monohydric alcohols containing from 3 to 8 carbon atoms in the alcohol residue constitute the preferred group. Because of their present commercial availability, butyl alcohol modified methylol melamine resins are particularly preferred, and the invention will be described hereinafter with specific reference to these resins.

The following example is illustrative of one method of preparing a typical resinous ether derivative of a methylol melamine useful in accordance with the principles of this invention.

*Example A*

A mixture of 675 parts of 39% aqueous formaldehyde solution (pH 3.5), 1 part monosodium phosphate monohydrate, 2500 parts of n-butanol, 500 parts toluene and 315 parts of melamine were heated under reflux and stirring until 470 parts of water had been separated from the condensate. Thereafter 2440 parts of solvent were distilled from the reaction mixture. A small amount of white precipitate was filtered off and the desired n-butyl ether resin was contained in a clear slightly viscous solution containing 60.7% solids.

The nitrocellulose used should contain from 10–13% nitrogen, the choice depending on the solubility characteristics desired for blending with a given thermosetting resin.

The ratio of alcohol modified methylol melamine resin to nitrocellulose in the anchor composition may vary from 20/80 to 75/25. When subcoats contain resin and nitrocellulose in a ratio of less than 20/80 or more than 75/25 the heat seal bond strength drops sharply to an unsatisfactory value.

To promote polymerization and hardening of the alcohol modified methylol melamine resins it is generally desirable to incorporate an acid catalyst in the coating composition. Catalysts for this purpose are well known in the art and include the usual acidic condensing agents of which maleic acid and para-toluene sulfonic acid are to be particularly preferred for use in the composition of this invention. The catalyst should be used in amounts ranging from 4% to 40% based on the weight of resin in the anchor composition.

Any volatile organic solvent for nitrocellulose and for the alcohol modified methylol melamine resin may be used in the anchor coating composition. Those particularly recommended are acetone, ethanol, butanol, toluene, benzene, ethyl acetate, amyl acetate, and the like, and mixtures thereof. The consistency of the solution is governed in each case by the apparatus employed, the thickness of coating desired, and similar factors. In general, solutions containing from 1% to 20% of solids are satisfactory, though those containing about 4–6% of solids are preferred.

Preliminary polymerization of the resin contained in the anchor coating composition need be carried out only to the extent sufficient to insolubilize the subcoat so that top-coating is possible without redissolving the subcoat. The required degree of polymerization results with a few seconds exposure to rapidly moving air heated to 100° C. for example and hence is readily obtained in the solvent removal stage. Further polymerization to develop optimum adhesion may be carried out during the drying of the top-coat.

Because of their superior moistureproofness those vinylidene-acrylonitrile copolymers containing at least 80% of vinylidene chloride are preferred in the top-coating composition. The preparation of vinylidene-acrylonitrile copolymers containing at least 80% vinylidene chloride and soluble in organic solvents, e. g. methyl ethyl ketone, is described and claimed in United States patent application of Chester R. Hardt, Serial No. 605,185, filed July 14, 1945, now abandoned. The preparation of vinylidene chloride-acrylonitrile copolymers in general is disclosed in United States Patent No. 2,278,415 (Arnold). For optimum results a solution containing about 15% solids, i. e., copolymer, is applied in an amount sufficient to uniformly deposit about 8 grams per square meter of copolymer in the base film. However, depending on the equipment and method of coating used, and the degree of moistureproofness required, solutions containing more or less solids and coatings of greater or lesser thickness can be applied with good result.

The application of the coating compositions of this invention may be accomplished in any suitable manner such as by passing the base film through a bath of the coating composition, by spraying or brushing the composition on the base, etc. After application any excess of the coating may be removed by the usual expedients such as by doctor blades, doctor rolls, etc.

By the term "anchor" or equivalent expressions used herein is meant the securing of the surface coating on the base to the end that the coating will not loosen, slough, blister or flake from the base film even when the coated film is subjected to severe conditions as by being maintained in direct contact with water for substantial periods of time (at least two days in water at 20° C.) or by being exposed to a wide range of temperature and humidity conditions, etc. Moistureproofness, heat seal bond strength, and kindred terms and expressions are defined in U. S. Patent No. 2,147,180 (Ubben) and are employed herein in accordance with such definitions.

The following examples, embracing preferred embodiments, will further illustrate the practice of this invention. Throughout the specification and claims, parts and percentages are by weight unless otherwise indicated.

Example I

Regenerated cellulose film 0.0012 of an inch thick containing 24% of glycerol was coated with a composition consisting of a 6% solution of

| | Per cent |
|---|---|
| Butanol modified melamine formaldehyde resin | 65 |
| Para-toluene sulfonic acid | 10 |
| Nitrocellulose (11.6% N) | 25 | in ethyl acetate, and dried in air at a temperature of 130–140° C. for a period of 20 seconds. The coating was applied at the rate of 2 g./sq. m. of solids.

After bringing the coated sheet as produced above to normal humidity, it was moistureproofed by coating it at the rate of 8 g./sq. m. of solids with a composition consisting of a 15% solution of vinylidene chloride - acrylonitrile copolymer containing 80% vinylidene chloride and 20% acrylonitrile dissolved in methyl ethyl ketone. Final drying was conducted in air at a temperature of 150° C. for a period of 20 seconds.

The heat-seal bond strength of the resulting moistureproof transparent coated film was 600 grams which compares with a heat-seal bond strength of 60 grams for a vinylidene chloride-acrylonitrile copolymer-coated regenerated cellulose film identical with the film produced as described above save for the omission of the anchor or subcoat. In addition the coating showed no tendency to loosen or flake from the base sheet even after immersion in water for a period of at least 2 days at 20° C.

Example II

Regenerated cellulose film 0.0012 of an inch thick containing 24% of glycerol was coated with a composition consisting of a 10% solution of:

| | Per cent |
|---|---|
| n-Butanol modified melamine formaldehyde resin | 24 |
| Nitrocellulose (11.4% N) | 71 |
| Maleic acid | 5 | dissolved in a solvent mixture consisting of:

| | Per cent |
|---|---|
| Ethyl acetate | 93.5 |
| Toluene | 1.5 |
| n-Butanol | 5.0 | and dried at a temperature of 130–140° C. for 20 seconds. The coating was applied at the rate of 6–8 g./sq. m. of film.

Thereafter the subcoated film was top-coated with a composition consisting of a 15% solution of 80/20 vinylidene chloride-acrylonitrile copolymer dissolved in methyl ethyl ketone and the coated film was then dried in air at a temperature of 150° C. for a period of about 20 seconds.

The resulting moistureproof, transparent coated film conditioned at a relative humidity of 35% and a temperature of 75° F. had an initial heat-seal strength of 845 grams, and, like the film of the previous example, the coating remained substantially unaffected by water.

It is obvious that many changes and modifications can be made in the details of the invention as described above, and the invention includes all such modifications and changes falling within the spirit and terms of said invention as defined in the appended claims.

I claim:

1. Moistureproof, heat-sealable sheet wrapping material comprising a non-fibrous base film of regenerated cellulose provided with a continuous sub-coating comprising essentially a resinous aliphatic ether derivative of a methylol melamine wherein the ether radical of said derivative contains from 3 to 8 carbon atoms, and nitrocellulose, wherein the ratio of the resinous ether derivative to nitrocellulose is within the range of 20/80 to 75/25, and a continuous top-coating comprising essentially a vinylidene chloride-acrylonitrile copolymer containing at least 80% vinylidene chloride.

2. Moistureproof heat-sealable sheet wrapping material comprising a transparent, non-fibrous base film of regenerated cellulose provided with a continuous sub-coating comprising essentially a resinous aliphatic ether derivative of a methylol melamine wherein the ether radical of said derivative contains from 3 to 8 carbon atoms, and a nitrocellulose containing from 10–13% nitrogen, the ratio of the resinous ether derivative to nitrocellulose in said sub-coating being within the range of 20/80 to 75/25, and a continuous top-coating comprising essentially a vinylidene chloride-acrylonitrile copolymer containing at least 80% vinylidene chloride.

3. Moistureproof, heat-sealable sheet wrapping material comprising a transparent, non-fibrous base film of regenerated cellulose provided with a continuous sub-coating comprising essentially a resinous butyl ether derivative of a methylol melamine, and nitrocellulose containing from 10–13% nitrogen, the ratio of the resinous ether derivative to nitro-cellulose being within the range of 20/80 to 75/25, and a continuous top-coating comprising essentially a vinylidene chloride-acrylonitrile copolymer containing at least 80% of vinylidene chloride.

4. The process which comprises sub-coating a transparent, non-fibrous base film of regenerated cellulose with a composition comprising essentially a water-insoluble, organic solvent-soluble resinous aliphatic ether derivative of a methylol melamine wherein the ether radical of said derivative contains from 3 to 8 carbon atoms and nitrocellulose dissolved in an organic solvent, the ratio of the aliphatic resinous ether derivative to nitrocellulose in said composition being within the range of 20/80 to 75/25, heating said sub-coating to remove solvent and to further polymerize said resinous ether derivative, and thereafter top-coating said film with vinylidene chloride-acrylonitrile copolymer containing at least 80% vinylidene chloride dissolved in an organic solvent.

5. The process which comprises sub-coating a transparent, non-fibrous base film of regenerated cellulose with a composition comprising essentially an acid catalyst, a water-insoluble, organic solvent-soluble resinous aliphatic ether derivative of a methylol melamine resin wherein the aliphatic ether radical contains from 3 to 8 carbon atoms, and nitrocellulose containing from 10–13% nitrogen, dissolved in an organic solvent, the ratio of the resinous ether derivative to nitrocellulose in said composition being within the range of 20/80 to 75/25, heating said sub-coating to remove solvent, and to further polymerize said resinous ether derivative, and thereafter top-coating said film with an organic solvent solution of a vinylidene chloride-acrylonitrile copolymer containing at least 80% vinylidene chloride.

6. The process according to claim 5 wherein the ether derivative is a butyl ether derivative.

7. Moistureproof heat-sealable sheet wrapping material comprising a transparent, non-fibrous base film of regenerated cellulose provided with a continuous sub-coating comprising essentially a resinous aliphatic ether derivative of a trimethylol melamine wherein the ether radical of said derivative contains from 3 to 8 carbon atoms, and a nitrocellulose containing from 10–13% nitrogen, the ratio of the resinous ether derivative to nitrocellulose in said sub-coating being within the range of 20/80 to 75/25, and a continuous top-coating comprising essentially a vinylidene chloride-acrylonitrile copolymer containing at least 80% vinylidene chloride.

8. The process which comprises sub-coating a transparent, non-fibrous base film of regenerated cellulose with a composition comprising essentially an acid catalyst, a water-insoluble, organic solvent-soluble resinous aliphatic ether derivative of a trimethylol melamine resin wherein the aliphatic ether radical contains from 3 to 8 carbon atoms, and nitrocellulose containing from 10–13% nitrogen, dissolved in an organic solvent, the ratio of the resinous ether derivative to nitrocellulose in said composition being within the range of 20/80 to 75/25, heating said sub-coating to remove solvent, and to further polymerize said resinous ether derivative, and thereafter top-coating said film with an organic solvent solution of a vinylidene chloride-acrylonitrile copolymer containing at least 80% vinylidene chloride.

PAUL MATTHEW HAUSER.

REFERENCES CITED

The following references are of record in the file of this patent:

UNITED STATES PATENTS

| Number | Name | Date |
| --- | --- | --- |
| 2,122,433 | Meigs | July 5, 1938 |
| 2,238,020 | Hanson | Apr. 8, 1941 |
| 2,301,959 | Lanning | Nov. 17, 1942 |
| 2,334,236 | Arnold et al. | Nov. 16, 1943 |
| 2,392,972 | Cheyney | Jan. 15, 1946 |